United States Patent Office 3,343,060
Patented Sept. 19, 1967

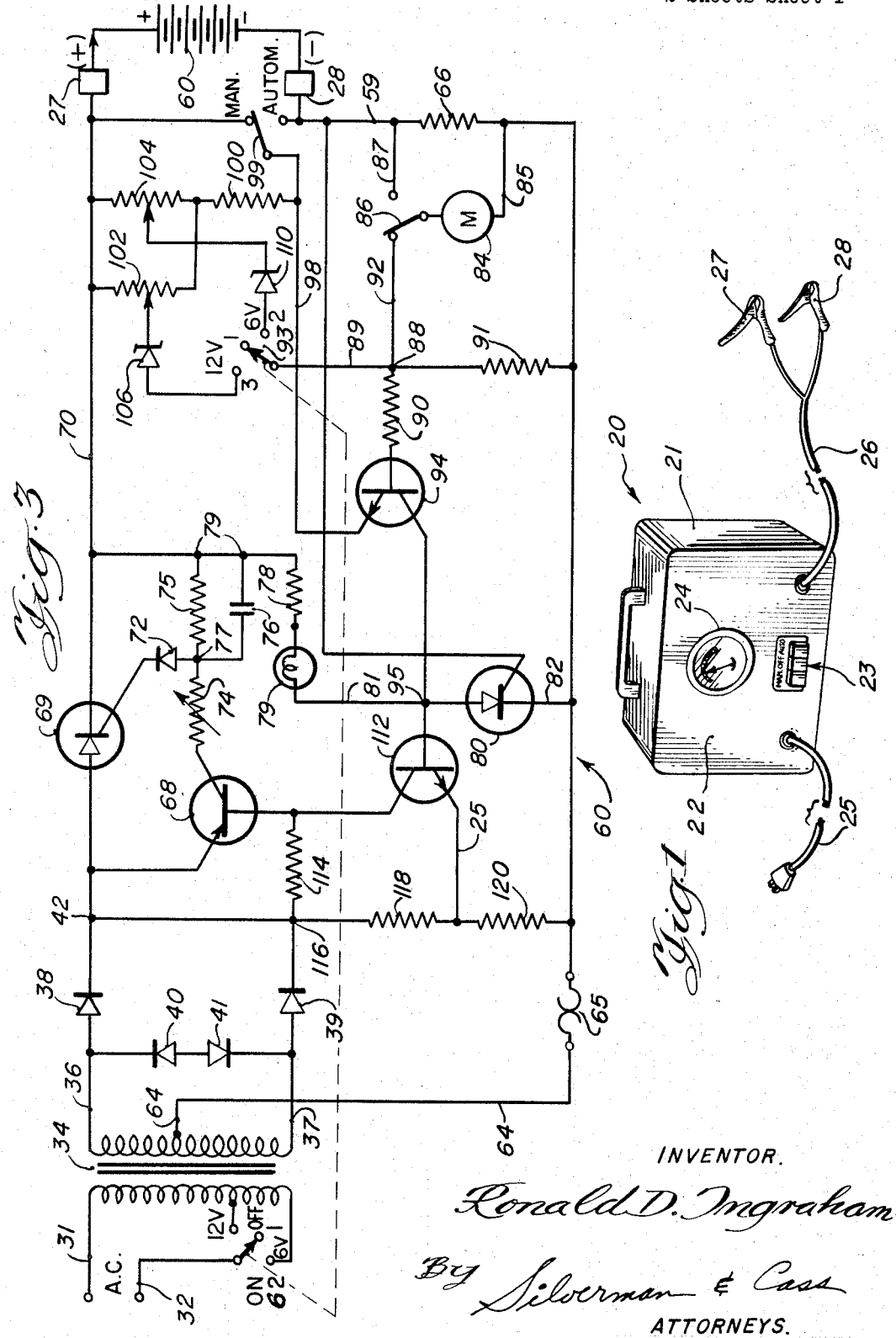

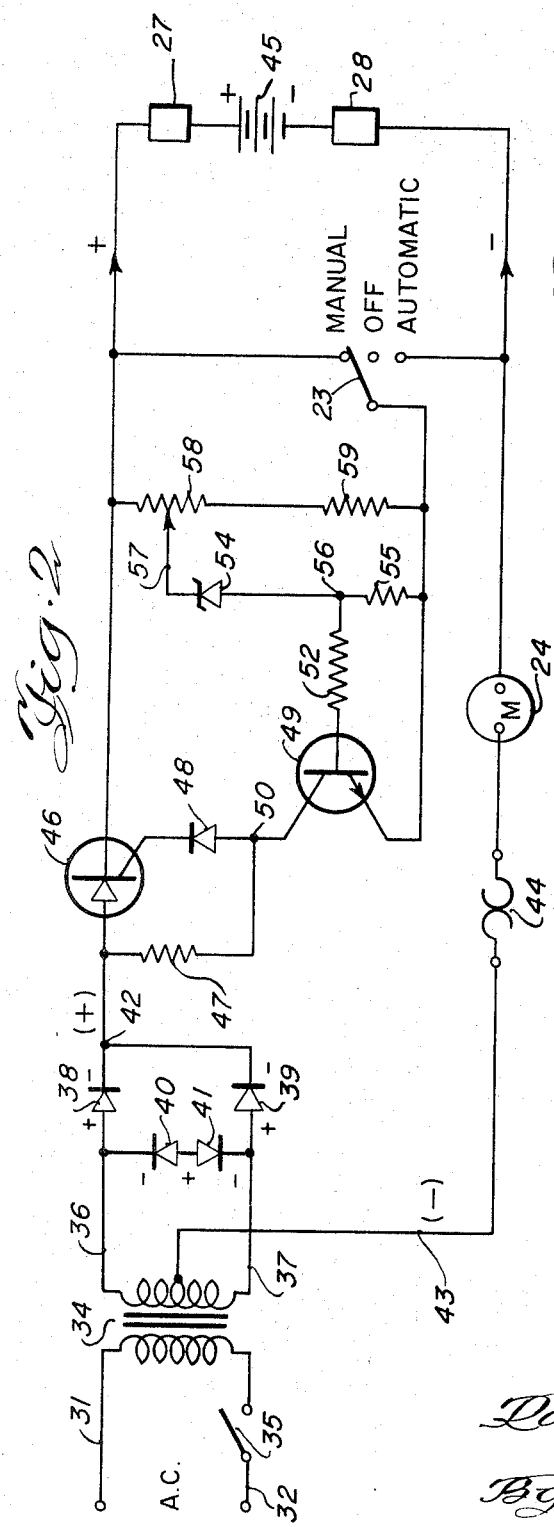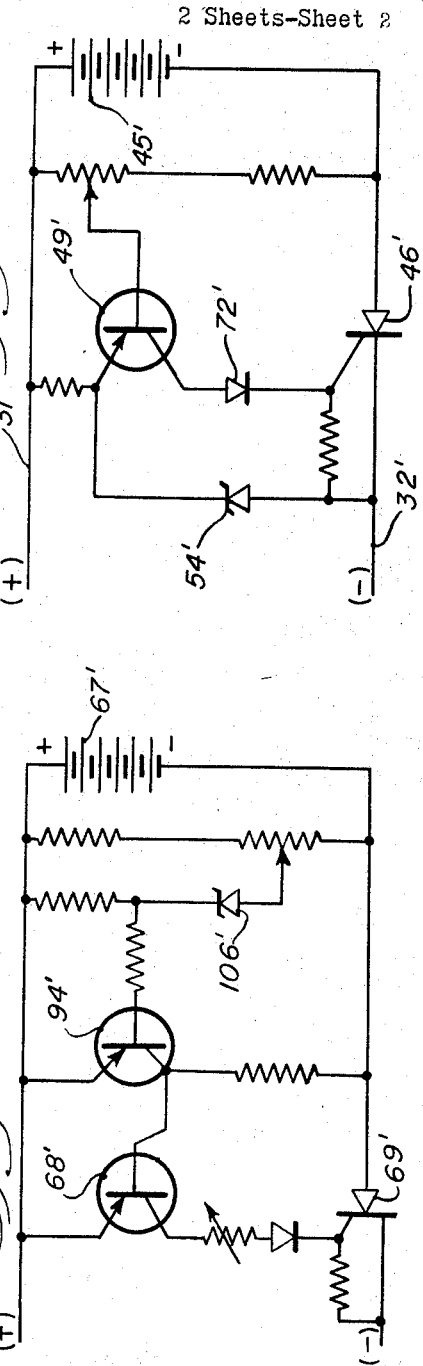

3,343,060
REGULATOR CIRCUIT FOR BATTERY CHARGERS
Ronald D. Ingraham, La Grange, Ill., assignor, by mesne assignments, to Introl Corporation, a corporation of Minnesota
Filed July 6, 1964, Ser. No. 380,282
4 Claims. (Cl. 320—40)

This invention relates generally to battery charging apparatus and more particularly, relates to a battery charger of the character described which includes a novel regulating circuit using the silicon controlled rectifier to provide automatic and continuous battery charging accurately controlled by the terminal voltage of the battery to which it is connected.

Although the silicon controlled rectifier, which commonly is referred to as SCR, has been used as a static switching device to provide regulating circiut means for battery charging devices, such battery charger designs as heretofore evolved have been less that. satisfactory in many important respects. Particularly, this has been most apparent where the battery charging equipment is used to charge batteries in many different uses, such as, where the battery is connected in burglar or fire detection and alarm systems, or in marine establishments, laboratories, automobiles, and many others too numerous to mention. Such prior battery chargers were either too low or too high in their charging rate; they were unreliable in their performance by reason of the influence of changing temperature and specific gravity of the electrolyte, age of the battery, unusual current requirements of the electrical system in which the battery is connected; they failed to provide reliable and adequate protection against change of circuit components by A.C. input surges; they were not completely reliable in preventing overcharging under all hook-up conditions; and they failed to maintain the desired terminal voltage for the battery at all times when connected. In addition, prior SCR regulating circuits were highly complicated and contributed to increasingly expensive battery charging apparatus when the battery charger design sought optimum performance under the variations in battery condition and electrolyte factors mentioned.

Accordingly, it is a primary object of the invention to provide a battery charger of the character described having an automatic regulating circuit which substantially eliminates all of the disadvantages enumerated herein as well as others.

Another object of the invention is to provide a battery charger with silicon controlled rectifier regulating circuit which will operate continuously to turn the charger on and off governed by the terminal voltage requirements of the battery, said charger capable of remaining in constant operational hook-up so as to permit diversified use thereof.

Another object of the invention is to provide an automatically regulated battery charger of the character described which will operate at a selected high charge rate so as to raise the terminal voltage of the battery to the full battery charge condition desired in a shorter period of time and thereafter automatically curtailing charging current supply to the battery so as to prevent battery overcharging, electrolyte evaporation, etc.

Another object of the invention is to provide a battery charger of the character described having a silicon controlled rectifier control circuit which enables the battery charger to supply D.C. charging current at or near the maximum output of the charger until the terminal voltage of the battery rises to a selected level or threshold and which thereafter automatically and instantaneously halts the D.C. charging current supply to the battery.

Other objects of the invention are to provide a battery charger of the character described having a control circuit without moving components; which operates efficiently and rapidly at a high rate of charge; which can supply D.C. charging current at high rate so that better and more efficient use of down time is made for recharging batteries; which is very sensitive in its response to threshold or selected level of terminal voltage of the battery which triggers or controls D.C. charging current supply to the battery or curtailment thereof, as the case may be; and which is economical and simple to make.

The foregoing and other objects of the invention will become apparent from the ensuing description in which embodiments of the invention are described in detail and illustrated in the accompanying drawing. Minor variations in circuit connections and electrical components used may occur to the skilled artisan without departing from the scope or sacrificing any of the advantages of the invention.

In the drawing wherein the same characters of reference are employed to identify identical or equivalent components throughout the several figures thereof:

FIG. 1 is a perspective view of a representative battery charger having the automatic regulating circuit embodying the invention incorporated therein.

FIG. 2 is a simplified circuit diagram of a battery charging system having one form of the invention embodied therein and applied to a single battery.

FIG. 3 is a simplified circuit diagram of a modified embodiment of the invention and capable of application to a multiple battery system.

FIG. 4 is a simplified circuit diagram of another modified embodiment of the invention.

FIG. 5 is a simplified circuit diagram of yet another modified embodiment of the invention.

Referring now to the drawing, in FIG. 1 the reference character 20 designates generally a representative portable battery charging instrument having the advantageous electronic circuitry and components embodying the invention. The size and configuration of the instrument 20 may vary within wide limits. The ventilated housing or case 21 has a front control panel 22 with a selector switch 23 which may use the push buttons illustrated or any other suitable means for selecting switching positions. As illustrated, the switch 23 has possible positions labelled OFF, AUTO which refers to "automatic" and "MAN" which refers to "manual." An ammeter 24 is provided in this model of instrument, however, this component can be omitted without detracting from the invention. Charger 20 is intended to be connected to a conventional A.C. source wall outlet by means of the electrical cord 25. The electrical charging cord 26 has clips 27 and 28 for connecting the instrument 20 to the terminals of a battery, such as the conventional lead-acid battery. Conveniently, suitable means, such as colored insulation on the leads to said clips 27 and 28 may be provided to assist in obtaining correct polarity connection of the clips 27 and 28 with the battery terminals.

Referring to FIG. 2, the battery charger with novel regulating circuit embodying the invention is designated generally by the reference character 30. The charger 30 is connected across an alternating current or voltage source such as the conventional A.C. wall outlet by the power leads 31 and 32 provided by the cord 25 seen in FIG. 1.

The power leads 31 and 32 are connected across the primary of transformer 34 and single pole, single throw switch 35 in series with the primary. The output leads 36 and 37 from the secondary of the transformer 34 each has in series with it a heavy duty diode 38 and 39 respectively which act as rectifiers. In parallel with the secondary of the transformer 34 is a pair of selenium diodes 40 and 41 which are mounted in series one relative to the other and back to back to act as a voltage transient damping means to prevent input line transients from damaging the solid state rectifiers in the circuit.

The cathodes of the diodes 38 and 39 are connected together to constitute them the positive terminal 42 of a D.C. power source. Lead 43 is connected as a center tap on the secondary coil of transformer 34 and constitutes the negative terminal of the D.C. source. The lead 43 is connected in series with a thermal circuit breaker 44 and the ammeter 24 and then by a suitable means such as the clip 28 to the negative terminal of the battery 45 to be charged.

The voltage at the positive terminal 42 of the D.C. power source is applied to a silicon controlled rectifier 46 which is interposed as an electronic switch in series with the pulsating D.C. source and the battery 45. Positive gating voltage for SCR 46 is applied to the resistor 47 and the diode 48. The diode 48 serves to prevent reverse gate current in the SCR 46.

The collector of a NPN transistor 49 is connected to the juncture 50. The emitter of the transistor 49 is connected to the pole side of a single pole, triple throw switch previously identified 23 in FIG. 1. The base of a transistor 49 is connected to a resistor 52 and Zener diode 54 in series and there is provided the resistor 55 which functions as a shunt in the emitter circuit of the transistor 49. For this purpose, the resistor 55 is connected between the juncture 56 and the emitter. The Zener diode 54 is connected to the variable contact 57 of the potentiometer 58. The potentiometer 58 is connected in series with a resistor 59 between the positive side of the SCR 46 and the emitter of the transistor 49 thereby to constitute a voltage divider.

One contact of the switch 23 is connected to the positive terminal of the battery 45 and the other contact of the switch 23 is connected to the negative side of said battery. When the switch 23 is in the positive position, or the position which is designated "Manual" in FIG. 2, transistor 49 and the electrical components through 59 to which said transistor is connected, are inactive. In this condition, the D.C. output is applied through the SCR 46 to the positive terminal of the battery 45 for charging the battery in the conventional manner.

When the switch 23 is in the negative position or the position designated "Automatic," the battery 45 is charged so that its terminal voltage rises. The potentiometer 58 selects a portion of the battery voltage and applies it to Zener diode 54. While the terminal voltage of the battery 45 remains below a selected voltage or predetermined value, transistor 49 is biased to a non-conducting condition. As the voltage rises to the predetermined value, Zener diode 54 commences to conduct. Current flow through the Zener diode 54 biases transistor 49 so as to permit it to conduct current in its collecter circuit thus reducing the voltage at juncture 50. Reduction of the voltage at juncture 50 in turn reduces the gate voltage of SCR 46, the reduced gate voltage of the SCR 46 thereby delaying firing of the SCR thereby reducing the average charging current. In this manner, the battery 45 will be charged at the maximum output of the D.C. current source until the terminal voltage of the battery rises to a selected level for the Zener diode 54 to commence conducting and consequently reducing the gate voltage of the SCR 46 with addendant reduction in the D.C. charging current.

The rectification circuit for the last mentioned SCR is of a full wave rectifier type. With reference to ground, the voltage at positive juncture 42 is opposed by battery 45 and generates a threshold control voltage upon conduction by transistor 49. This voltage is applied to the silicon controlled rectifier 46. With the transistor 49 nonconducting, gate firing current is obtained from the SCR anode supply through the diode 48. The SCR therefore is fired at the beginning of the cycle of the input A.C. and current flows into the battery 45. The SCR turns off at the end of each half cycle. The diode 48 serves to prevent flow of reverse gate current. As the terminal voltage of the battery rises, potentiometer 58 selects a portion of this terminal voltage and applies it to the Zener diode 54. While the terminal voltage of the battery 45 remains below a selected value, transistor 49 is biased nonconductive. When the terminal voltage of the battery rises to the selected value, Zener diode 54 commences to conduct. This current flows forward to bias the transistor 49, permitting it to conduct. The voltage at juncture 42 is lowered toward ground thus reducing the gate voltage and thereby delaying firing of the SCR 46. The average charging current drops as a result so that the net effect is to obtain a phase-controlled charging rate. The purpose of the Zener diode 54 is to provide a threshold effect; that is, the full wave battery charger will deliver at a maximum current charging rate until the terminal voltage of the battery rises to a selected value or level. Without this feature, the charge rate would be continuously reduced as the terminal voltage of the battery rose thus lengthening the time required for reaching the desired condition of battery charge. The sharpness of the threshold depends upon the knee characteristics of the Zener diode 54 and the gain of the transistor 49. Sharpness can be increased by adding additional stages of amplification, that is, additional transistors.

Referring to FIG. 3, a modified battery charger embodying the invention has been designated generally by the reference character 60. Here, a full wave rectifier circuit for providing a D.C. source of current is employed which is substantially similar to the rectifier discussed in connection with FIG. 1. For this reason, the same reference numerals will be used for FIG. 3 as are used in FIG. 2 to designate corresponding components. A.C. power input lead 31 is connected to one side of the primary coil of transformer 34 and the other A.C. power input lead at 32 is connected to one side of a single pole, three-position switch 62. The center position of the switch 62 is "OFF" to prevent current flow in the transformer primary. The second switch position places the input power across the full primary coil of the transformer 34. The third position is to a tap to the primary coil of the transformer. When this tap is energized, the ratio between the primary and secondary coils of transformer 34 is such that the transformer output is one-half that of the second switch position.

A transient protection device provided by the diodes 40 and 41 connected back to back is provided in the same manner as discussed in connection with FIG. 2 to prevent A.C. input transients from damaging any of the circuit components. Rectifier diodes 38 and 39 are connected in series with the leads 36 and 37 respectively. The cathodes of rectifiers 38 and 39 are joined by a lead 11 to the juncture 42 so as to constitute the positive output of a D.C. power source. The transformer secondary center current lead 64 is the negative side of the D.C. power supply. Said center tap lead 64 is connected in series with a thermal circuit breaker 65, a meter shunt 66 and then to a suitable clip for connection to the battery 67 to be charged.

The emitter of transistor 68 and the anode of the SCR 69 are connected in common to the juncture 42 of the D.C. power supply. A lead 70 connects the cathode of the SCR 69 to a clip for connecting the charger circuit to the positive terminal of the battery 67.

A diode 72 joins one side of variable resistor 74, resistor 75 and capacitor 76 to the control terminal of the SCR 69. The opposite ends of resistor 75 and capacitor 76 are connected at a juncture 179. The juncture 179 is connected to the lead 70 and one side of the resistor 78 which acts as a current limiter for the bulb 79. The bulb 79 is connected to the anode of SCR 80 to the lead 81. The cathode of the SCR 80 is wired through lead 82 to the junction of the circuit breaker 65 and the meter shunt 66 which are in series in the negative output of the D.C. supply. The gate of SCR 80 is connected to the juncture of meter shunt 66 and the negative terminal of the battery 67.

One side of the meter 84 is connected to one side of the shunt 66 through the lead 85 where the other side of said meter is connected to a single pole, double throw switch 86. In one position of this switch, meter 84 is connected to the battery side of shunt 66 through lead 87. The meter 84 will read the charging current with switch 86 in this position. Meter 84 will read voltage, in the second position of switch 86, which is connected to the juncture 88 of lead 89, resistor 90 and resistor 91 by the lead 92.

Lead 89 is connected to the contact selector of switch 93. This switch is a three-position switch mechanically linked to the switch 62. Resistor 90 joins the base of transistor 94 to the juncture 88; resistor 52 is connected between juncture 88 and the juncture of circuit breaker 65 and shunt 66.

The collector of transistor 94 is connected to the juncture 95 of lead 96 with the anode of the SCR 80. The emitter of transistor 94 is connected by lead 98 to the pole of single pole double throw switch 99. One side of switch 99 is connected to the positive terminal of the battery 67. When switch 99 is in this disposition, the battery 67 will charge in the conventional manner with the charge current decreasing as the battery voltage increases. When switch 99 is in its second position, the emitter of transistor 94 is connected to the negative terminal of battery 67. At the same time, a voltage divider provided by resistor 100 in series with potentiometers 102 and 104 connected in parallel is connected across the battery 67; Zener diode 106 is connected between the variable contact of potentiometer 102 and one position of switch 93. Zener diode 110 is connected between the variable contact of potentiometer 102 and an opposite, second position of switch 93. Zener diode 106 is in use when the higher output of transformer 34 is supplied and Zener diode 110 is in use when the lower output of transformer 34 is called upon. The combined switches 62 and 93 are constructed so that the input to the transformer 34 and to the voltage divider 104 and 102, in series with resistance 100, are changed simultaneously. The values of potentiometers 104 and 102 are such that Zener diodes 106 or 110 begin to conduct current when the battery 67 reaches a predetermined voltage. The base of transistor 112 joins the collector of transistor 94 at the point joining lead 81 to the anode of SCR 80 namely, juncture 95. The collector of transistor 112 is connected to the base of transistor 68 with the collector of transistor 112 and juncture 116 of the D.C. power supply. Resistor 118 is connected at one end thereof to juncture 116 and at the other end thereof to the emitter of transistor 112 and to resistor 120. Resistor 120 connects to the juncture between circuit breaker 65 and meter shunt 66.

In operation, the input switch 62 is set for the output necessary to charge the battery 67. Concurrently, the third charge voltage has been selected by switch 93. Current flows freely through SCR 69 which is biased through diode 72 and resistor 75. The maximum current is delivered to the battery 67 until its voltage reaches the value or level set for Zener diode 106 or 110 to begin conducting. When either diode conducts, transistor 94 is biased to accomplish the following: the bulb 79 is energized and the firing voltage to SCR 69 is reduced thereby curtailing conduction thereof. Finally, resistor 112 in turn is unbiased. Since the base of transistor 68 is connected to the collector circuit of transistor 112, it too is unbiased.

SCR 80 serves as a safety device to protect the circuit in case of overloading by reason of any unusual current surges to the circuit. In that case, SCR 80 would be biased so that it would commence to conduct to energize the bulb 79 and reduce the bias voltage to SCR 69. This would curtail charging current to the battery. It will be appreciated that bulb 79 is used as a variable resistance ballast. When the voltage to junction 95 is derived from a very low battery voltage, resistor 78 is selected to pass optimum current. Under higher voltage conditions, current through resistor 78 would get too high. However, the additional current through bulb 79 raises its resistance, tending to stabilize the current at a lower value. This feature is optional since it is merely additive to the advantages already derived from the control circuit. Protection against incorrect polarity connection is achieved by transistors 112 and 68 through the bulb 79 and resistor 78. In the absence of sufficient voltage of correct polarity from the battery, transistor 112 will not conduct. Therefore, transistor 68 will not conduct so that firing current for SCR 69 is lacking.

It is important to note that the invention provides for a firm charging current to the battery at all times until the preset value or level of terminal voltage is reached. When this level is reached, the charging SCR is rendered non-conducting and turns off so that there is no voltage supplied to the battery. As previously mentioned, the use of silicon controlled rectifiers as static switches has been known. However, in one case, the SCR is switched completely off by regenerative action but a trickle charge current is provided by a suitable resistor. In this case the circuitry is quite complex and the SCR functions more in the manner of a mechanical relay. In another such circuit, a Zener diode is used without the transistor amplifier. In this case, however, the Zener diode is used as a reference "voltage regulator" rather than as a switch. The invention achieves extreme sensitivity for controlling voltage delivered to the battery for charging only in accordance with the demands of the battery. This circuitry is not dependent on ambient temperature of the atmosphere and provides for continuous control as distinguished from variable control. The charge rate is fast and high at all times until the desired terminal voltage level of the battery is reached, and all danger of overcharging is completely eliminated.

The modified embodiments of the invention illustrated in FIGS. 4 and 5 represent application of the SCR regulating system in the negative leg of a D.C. power supply as distinguished from utilization thereof in the positive leg of a power supply as discussed in connection with FIGS. 2 and 3. Consequently, in describing these modified embodiments, like reference characters, albeit primed, will be employed to identify corresponding electrical components.

FIG. 4 represents conversion of FIG. 2 in this respect. The SCR 46' anode is connected to the negative side of the battery 45' and the cathode of the SCR is connected to the negative side of a D.C. power supply. The emitter of the transistor is held at some finite voltage by the action of the Zener diode. As long as the base is negative with respect to the emitter, the transistor conducts and, therefore, the SCR conducts. Current is delivered to the battery for charging. When the base voltage rises to a desired positive value, the transistor commences to cut off so as to reduce the firing voltage to the SCR. As a result, the current conduction circuit from the battery through the SCR is impeded.

In FIG. 5, the anode of the SCR 69' is connected to the negative terminal of the battery 67' and the cathode of the SCR is connected to the negative side of the power source. This represents conversion of the regulating circuit of FIG. 3 to that of FIG. 5 but without departure from the principles of operation of the regulating circuit embodying the invention. When the terminal voltage of the battery reaches the present level, the Zener diode 106' begins to conduct so as to reduce forward bias on the second transistor 94', namely, the transistor supplying gate firing current to the SCR. Consequently, the gate voltage of the SCR drops so as to delay firing. In this manner, an equilibrium condition is attained when the SCR conducts only enough to maintain the battery voltage at the preset level.

It will be appreciated that the invention is concerned with successfully applying the threshold characteristic of a diode, including the emitter-base diode of a transistor, for controlling a silicon controlled rectifier in battery charging apparatus so that the battery charging current is regulated and controlled strictly dependent upon the needs of the battery. It is believed that the invention has been described in sufficient detail to enable the skilled artisan to understand and practice the same in all of its ramifications.

What it is desired to secure by Letters Patent is:

1. A battery charger circuit having first and second output leads respectively adapted for distinctive connection to the positive and negative terminals of a battery to be charged, said circuit comprising, a positive and a negative output lead respectively connected to said output terminals, a three terminal silicon controlled rectifier having a two terminal conduction path connected in a forward direction through said output lead and a third, control electrode, an amplifying transistor having a conduction path connected in series with a control voltage developing resistor for said controlled rectifier, means for connecting said output leads to a source of alternating current, a Zener diode poled and connected for conduction in a reverse direction from said output lead to a control electrode of said amplifying transistor, voltage dropping resistor means connected in controlling relation with control terminals of said controlled rectifier and in series with conduction terminals of said amplifying transistor, said amplifying transistor being poled and connected with said resistor means connected in controlling relation with controlled rectifier upon conduction through said last named transistor, whereby current is passed through said Zener diode to allow conduction by said amplifying transistor as voltage applied to said output leads by a battery to be charged exceeds a preassigned threshold.

2. Apparatus as set forth in claim 1 and in combination therewith, variable resistor means connected in circuit with said Zener diode and a control electrode of said amplifying transistor for selectively establishing a threshold of conduction from a battery to be charged to said transistor control electrode.

3. A battery charger circuit having first and second output leads respectively adapted for distinctive connection to the positive and negative terminals of a battery to be charged, an input transformer for said circuit adapted for energizing connection to a source of alternating current and having a first switch for selectively applying said alternating current to portions of the primary winding thereof, said transformer having an output winding, a first, positive output lead, a second, negative output lead, said first and second leads being respectively connected to an end terminal and to a center top of said output winding, a silicon controlled rectifier having a conduction path connected in said output lead and a control electrode, a first, amplifying transistor connected in circuit with said end terminal and said control electrode of said silicon rectifier, a variable resistor connected in circuit from said first transistor to said control electrode whereby amplified potentials from said first transistor are variably applied for controlling conduction by said controlled rectifier, a first and a second Zener diode selectively connected for reverse conduction from said first output lead to control conduction by said amplifying transistor, second switch means for selectively connecting said first and second Zener diodes in controlling relation with said silicon controlled rectifier, first and second variable resistor means respectively connected in circuit with said second switch means and said first output lead, whereby the voltage on said last named lead acts selectively to control conduction by said silicon controlled rectifier, and means for operating said first and second switching means in concert.

4. Apparatus as described in claim 3 and, in combination therewith, a Zener diode connected in a reverse direction between said first and second output leads, resistor means connecting one conduction terminal of said transistor in common with said Zener diode to one of said output leads and resistor means for coupling a remaining terminal of said Zener diode to a control terminal of said controlled rectifier.

References Cited
UNITED STATES PATENTS

| | | | |
|---|---|---|---|
| 3,018,432 | 1/1962 | Palmer | 323—66 |
| 3,114,095 | 12/1963 | Palmer | 320—39 |
| 3,160,805 | 12/1964 | Lawson | 320—39 |
| 3,265,956 | 8/1966 | Schlabach | 323—22 |
| 3,281,638 | 10/1966 | Crawford | 320—40 |

JOHN F. COUCH, *Primary Examiner.*

S. WEINBERG, *Assistant Examiner.*